(12) United States Patent
Vergamini

(10) Patent No.: US 10,336,160 B2
(45) Date of Patent: Jul. 2, 2019

(54) VEHICULAR COOLING SYSTEM

(71) Applicant: Fernando Celso Sodre Vergamini, Sao Paulo (BR)

(72) Inventor: Fernando Celso Sodre Vergamini, Sao Paulo (BR)

( * ) Notice: Subject to any disclaimer, the term of this patent is extended or adjusted under 35 U.S.C. 154(b) by 241 days.

(21) Appl. No.: 15/233,605

(22) Filed: Aug. 10, 2016

(65) Prior Publication Data
US 2017/0043647 A1 Feb. 16, 2017

Related U.S. Application Data

(60) Provisional application No. 62/203,735, filed on Aug. 11, 2015.

(51) Int. Cl.
| | | |
|---|---|---|
| *B60H 1/00* | (2006.01) | |
| *B60H 1/32* | (2006.01) | |
| *B60H 3/02* | (2006.01) | |
| *B60H 3/00* | (2006.01) | |

(52) U.S. Cl.
CPC .......... *B60H 1/3202* (2013.01); *B60H 3/022* (2013.01); *B60H 3/0092* (2013.01); *B60H 2001/00235* (2013.01)

(58) Field of Classification Search
CPC ...... B60H 1/3202; B60H 1/262; B60H 1/245; B60H 1/00535; B60H 1/00507; B60H 1/00514; B60H 2001/00235; B60H 3/022; B60H 3/0092; B60H 3/02; F24F 2001/0085; F24F 6/02
USPC ..................................... 62/323.2, 259.4, 239
See application file for complete search history.

(56) References Cited

U.S. PATENT DOCUMENTS

| | | | | |
|---|---|---|---|---|
| 3,372,911 A | * | 3/1968 | Herboldsheimer .. | B60H 1/3202 261/24 |
| 3,606,982 A | * | 9/1971 | Anderson ............ | B60H 1/3202 261/29 |
| 3,867,486 A | * | 2/1975 | Nagele ..................... | F24F 6/04 261/106 |

(Continued)

FOREIGN PATENT DOCUMENTS

| | | |
|---|---|---|
| BR | PI0306118-3 A | 8/2005 |
| BR | PI 0306118-3 A † | 8/2005 |

(Continued)

OTHER PUBLICATIONS

RESFRI as 6 Owner's Manual, Mar. 2012.

(Continued)

*Primary Examiner* — Joseph F Trpisovsky
(74) *Attorney, Agent, or Firm* — David Duckworth

(57) ABSTRACT

A vehicular cooling system is provided which includes a water tank, a cooling unit, a vent unit, a closed loop conduit assembly, and a water pump. The cooling unit includes an evaporative media in the shape of a closed loop structure having a center hole. The evaporative media is gas porous and preferably made of bactericidal wood shavings. The water pump pumps water from the water tank to saturate the evaporative media to provide water-saturated-air. The cooling unit includes an air pump for sucking air through the evaporative media into a vehicle's interior. Advantageously, the vehicular cooling system requires minimal modification of a vehicle structure.

4 Claims, 15 Drawing Sheets

(56) References Cited

U.S. PATENT DOCUMENTS

| | | |
|---|---|---|
| 5,285,654 A | 2/1994 | Ferdows |
| 5,605,055 A | 2/1997 | Salgado |
| 6,112,538 A | 9/2000 | Strussion |
| 6,393,857 B1 | 5/2002 | Malueg |
| 6,511,049 B2 * | 1/2003 | Colussi ................ F24F 5/0035 261/106 |
| 6,539,730 B1 | 4/2003 | Hesse et al. |
| 6,546,743 B1 | 4/2003 | Sullivan et al. |
| 6,546,744 B1 | 4/2003 | Cavender |
| 6,575,436 B2 * | 6/2003 | Litz .................... B60H 1/3202 261/107 |
| 6,796,136 B1 | 9/2004 | Sullivan et al. |
| 6,886,358 B2 | 5/2005 | Hille et al. |
| 8,403,304 B2 | 3/2013 | Petersen |

FOREIGN PATENT DOCUMENTS

| | | |
|---|---|---|
| BR | PI0900847-0 A2 | 12/2010 |
| BR | PI 0900847-0 A2 † | 12/2010 |
| BR | P11101962-0 A2 | 6/2013 |
| BR | PI 1101962-0 A2 † | 6/2013 |
| BR | 202014002878-7 U2 † | 12/2015 |
| BR | 202014011965-0 U2 | 11/2016 |

OTHER PUBLICATIONS

RESFRI Agro Owner's Manual, Jan. 2012.
REFRI as Roof Coolers Instruction Manual, 2009.
REFRI as Catalog, 2011.
BEPO Catalog, 2010.

\* cited by examiner
† cited by third party

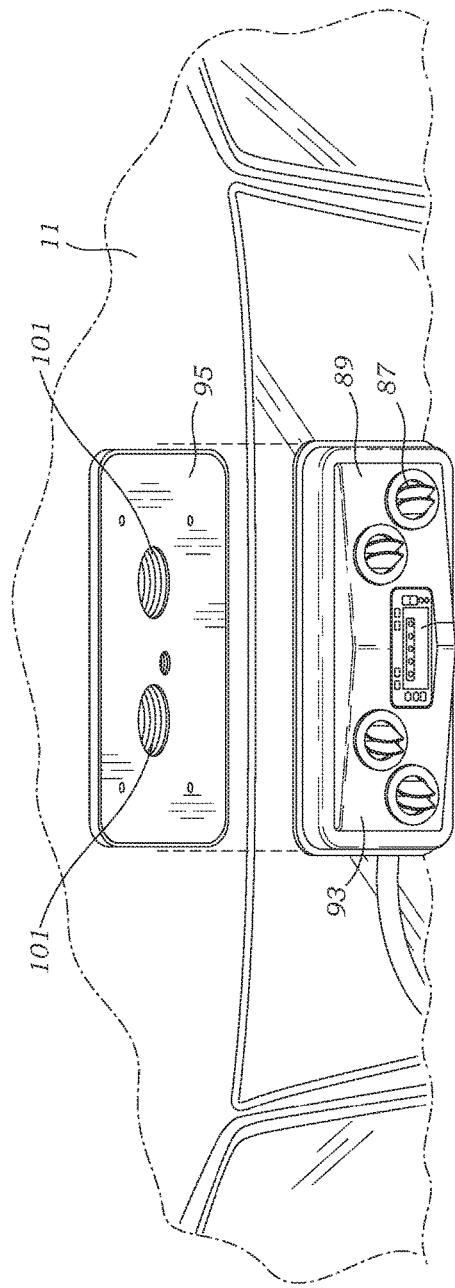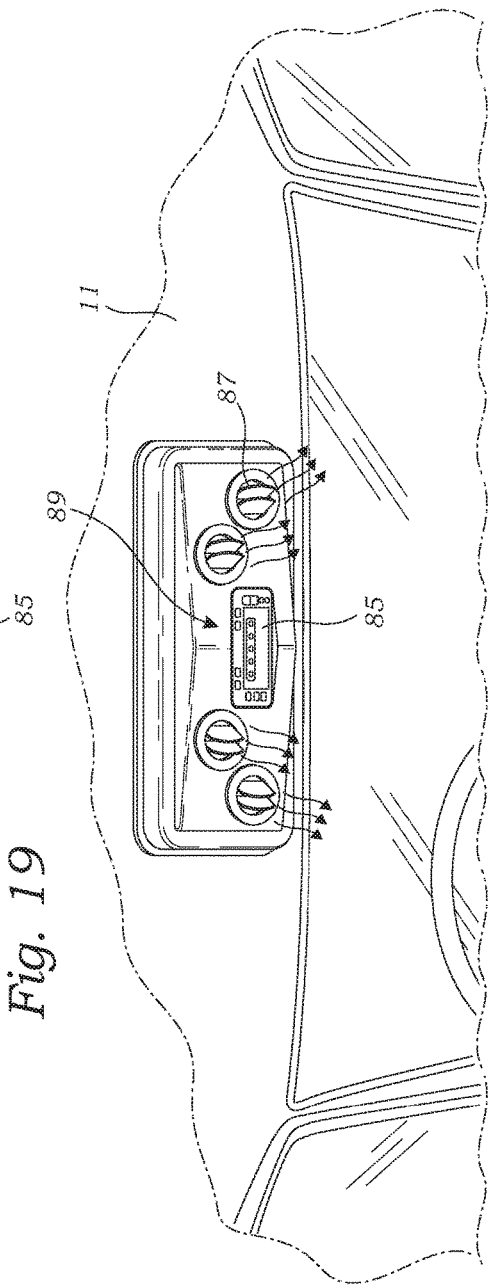

VEHICULAR COOLING SYSTEM

RELATED APPLICATIONS

The present application is a continuation-in-part of co-pending U.S. Provisional Patent Application Ser. No. 62/203,735 filed on Aug. 11, 2015.

BACKGROUND OF THE INVENTION

The present invention relates to cooling systems for cooling any type of vehicle, but particularly trucks, vans and golf carts. More particularly, the present invention relates to vehicular cooling systems which can be mounted on the roof of a cabin and which include an intake for external air which is humidified and then circulated within the vehicle cabin.

The interiors of vehicles parked in the sun can reach unacceptably high temperatures very rapidly. The interior temperature depends on the size of the vehicle, its color, materials forming the vehicle's structure and interior, the outside temperature, the radiant power of the sun, and various other factors. A high interior vehicle temperature reduces driving comfort and can lead to increased fuel consumption by use of an air conditioning system. It is not uncommon for vehicle owners to continue to run their engine even when the vehicle is not moving so as to activate the air conditioning system.

Vehicular evaporative cooling systems have been utilizing to cool vehicle interiors because they can be run using power from the vehicle's battery without operation of the vehicle engine. Furthermore, vehicular cooling systems are typically less expensive to operate and avoid the use of the refrigerant including those which have been known to be harmful to the atmosphere.

Vehicular evaporative cooling is generally carried out by passing air through an evaporative material manufactured from a porous material which is kept moist. The evaporative material fulfills a double function in both taking heat from the air, and functioning as a moisturizer by increasing the humidity within the air. The environment is cooled by the lower temperature of the humidified air (in the event that the water is colder than the ambient temperature) and by the evaporation of moisture.

In addition, a moving airstream can cause cooling. This cooling is achieved by transporting heat away from the skin. This process is increased if the skin is moistened with water that absorbs the heat prior to being removed from the skin through evaporation in a moving air stream.

These characteristics result in vehicular evaporative coolers providing significant benefits and advantages compared to traditional air conditioners. Vehicular evaporative coolers cost less to manufacture than air conditioning units and require less maintenance. Furthermore, since vehicular evaporative coolers do not consume power from the vehicle engine, vehicular evaporative coolers are capable of being operated even when the vehicle's engine is not running, and evaporative vehicular coolers do not reduce the available power reduced by the engine when the vehicle is moving.

Unfortunately, vehicular evaporative coolers still suffer from significant drawbacks. Perhaps foremost, the evaporative media within a vehicular cooler does not efficiently transfer moisture into the air. Furthermore, bacteria can build up within the moist environment of the evaporative media.

Still an additional disadvantage with vehicular evaporative coolers is that they typically require that a large hole be formed within the vehicle structure to accept the vehicular cooler unit. Unfortunately, his large hole degrades the structural integrity of the vehicle.

Thus, there is a significant need for a vehicular cooler which improves efficiency for humidifying the air.

There is also a need for a vehicular evaporative cooler that reduces the propensity of bacteria to form within the moist environment of a vehicular evaporative cooler.

Moreover, there is a significant need for an improved vehicular cooler construction that can be installed upon a vehicle with require that large holes be formed within the vehicle structure.

SUMMARY OF THE INVENTION

The present invention addresses the aforementioned disadvantages by providing an improved vehicular cooler which is particularly suited for cooling vehicle environments.

To this end, the vehicular cooling system includes a water tank. The water tank may be constructed in various forms as can be determined by those skilled in the art. However, in a preferred embodiment the water tank is a traditional receptacle or storage chamber capable of storing water. The tank may be any size, but a preferred tank will hold at least a few gallons of water. Where considerable cooling is desired before refilling the tank, a preferred tank stores at least 5 gallons of water. The tank may be mounted anywhere on the vehicle. However, it is preferred that the tank be mounted to a vehicle sidewall such as within the interior of the vehicle cabin or upon the exterior of the vehicle away from the engine which could transfer unwanted heat to the tank.

The vehicular cooling system further includes a cooling unit. The cooling unit can be mounted to any exterior panel of the vehicle such as a vehicle's roof, side panel or back door. However, in preferred embodiments the cooling unit is mounted upon the vehicle's roof. The cooling unit has a housing having a top, a bottom, and one or more sidewalls to form a central cavity. In a preferred embodiment, the housing is substantially rectangular so as to have a front side, rear side, left side, and right side. However, the housing can be any shape including round so as to have a single sidewall which circumferentially envelops the central cavity. The housing includes at least one inlet which projects through the sidewall so as to allow air to enter into the housing's central cavity. In addition, the housing includes at least one outlet which allows air to be expelled from the interior of the housing. Importantly, the housing's outlet is adjacent to the vehicle, and the vehicle possesses an opening so as to allow air to exit from the housing's outlet, and in through the vehicle's opening to the interior of the vehicle. For purposes herein, the housing's outlet is described as formed through the housing's bottom. However, the terms top, bottom and side are intended to be used as examples and thus the housing's bottom can be positioned adjacent to a vehicle's sidewall, such as against the vehicle's rear door.

The cooling unit includes an evaporative media positioned within the housing's cavity. The evaporative media is constructed in the shape of a closed loop having a center hole. The evaporative media has substantially homogenous construction which extends entirely around the closed loop. The closed loop can have various shapes such as forming a circle, triangle, polygon, oval, or any one of an infinite number of shapes wherein the closed loop has a center hole. The evaporative media's closed loop is positioned within the cooling unit in a manner that positions one side of the closed loop structure against the housing's top, and the opposite side of the evaporative media's closed loop structure against the housing's bottom. The evaporative media is made of a gas porous material so that air is capable of passing through the evaporative media's exterior to its interior hole. Furthermore, it is preferred that the evaporative media be made of a water absorbent material so as to absorb water. In a preferred embodiment, the evaporative media is made of wood strips, such as wood shavings or wood chips, which are packed loosely enough so as to allow air to pass freely through the evaporative material. In a preferred embodiment, the wood shavings are from pine wood or cedar wood which provide bactericidal properties.

The cooling unit further includes an air pump positioned within the housing's central cavity. The air pump is positioned within the evaporative media's center hole adjacent to the housing's outlet. The air pump is constructed so as to receive air from within the evaporative media's center and pump such air through the housing's outlet into a vehicle. The cooling unit may include any number of air pumps. In a preferred embodiment, the cooling unit includes a single air pump wherein the air pump includes one motor and two turbines. The rotation of the two turbines suck air through the evaporative media into the evaporative media's center hole, and then the pump turbines pump the air through the cooling unit's housing's outlet into the vehicle's interior.

The vehicular cooling system further includes a closed loop conduit assembly which includes a first conduit which connects the water tank to the cooling unit for transporting water within the water tank to the cooling unit for distribution upon the evaporative media. In addition, the closed loop conduit assembly includes a second conduit connecting the cooling unit to the water tank for transporting water within the cooling unit to the water tank. The closed loop conduit assembly is connected to at least one water pump for pumping liquid from the water tank to the cooling unit, and from the cooling unit back to the water tank.

In preferred embodiments, the vehicular cooling system includes a venting unit located within the vehicle's interior. The vent unit includes a housing, which is distinct from the cooling unit's housing. The vent unit has a top wall, a bottom wall, and one or more sidewalls. The vent unit top engages a vehicle wall, which is preferably the interior of the vehicle's roof, and includes one or more inlets which align with one or more holes formed in the vehicle's wall, which in turn align with the cooling unit's outlets. The vent unit further includes one or more vents, which are connected to the vent unit inlets, for expelling moist air pumped by the air pump into the vehicle interior.

Advantageously, the dual housing construction, including a cooling unit housing exterior to the vehicle and a vent housing interior to the vehicle, enables the vehicular cooling system to be installed upon a vehicle without a large hole formed through the vehicle roof. Instead, the cooling unit's bottom pan, vehicle roof, and vent housing's top wall include at one or more small coincidentally aligned air holes for communicating air from within the cooling unit's interior through the vent unit's vents. The vehicular cooling system may include any number of air holes which can be any shape. However, it is preferred that the cooling system has one or two air holes, each having an area of 50 in² or less, formed in the cooling unit's bottom pan, vehicle roof, and vent housing's top which allow air to be pumped from the cooling unit's interior to the vehicle's interior. Even more preferably, the cooling unit's bottom pan, vehicle roof, and vent housing's top wall include two small coincidentally aligned air holes, each having an area of 20 in² or less. Finally, the preferred construction includes two 4 inch diameter circular air holes formed through the cooling unit's bottom pan, vehicle roof, and vent housing's top which allow air to be pumped from the cooling unit's interior to the vehicle's interior.

In addition to the two air holes, the vehicular cooling system includes one small hole formed in the cooling unit's bottom pan, vehicle roof, and vent housing's top for the passage of the conduit assembly and electrical wiring (collectively referred to herein as a harness assembly) through the vehicle's roof. This small hole, referred to herein as the harness assembly hole, can be any shape, and preferably has an area of 20 in² or less. Even more preferably, the assembly hole has an area of 10 in² or less, and the preferred harness assembly hole is circular and has a diameter of one (1) inch.

In addition to the small air and harness holes, the vehicular cooling system requires only four small installation holes be formed through the vehicle roof to allow the passage of bolts from the cooling unit to the venting unit to affix both units to the vehicle roof. The installation holes may be any reasonable shape and size. Preferably, the installation holes are circular and have a diameter of ¾ inch or less. More preferred installation holes have a diameter less than ½ inch, and the preferred installation holes have a diameter of approximately ⅓ inch.

Both the air pump and water pump are preferably powered by electricity and connected to the vehicle's battery. In addition, the vehicular cooling system includes a controller for selectively supplying electricity to the air pump and water pump from the vehicle's battery. The controller may comprise a simple on/off switch, or may incorporate more complicated computer processing including a display, timer capabilities and/or thermistor control. Preferably, the controller, in the form of one or more switches or control processor, is affixed to the venting unit for easy access by the driver or passengers within the vehicle.

Accordingly, the vehicular cooling system of the present invention provides a system for cooling the interior of a vehicle which does not require that the vehicle's engine be running. In addition, the vehicular cooling system incorporates an evaporative media construction providing improved efficiency and bactericidal properties.

Other features and advantages of the present invention will be appreciated by those skilled in the art upon reading the detailed description which follows with reference to the attached drawings.

BRIEF DESCRIPTION OF THE DRAWINGS

FIG. 19 is a perspective view illustrating the installation of a vent unit within the interior of a vehicle; and FIG. 20 is a perspective view of a vent unit within a vehicle interior.

DETAILED DESCRIPTION OF THE INVENTION

Figure 1:
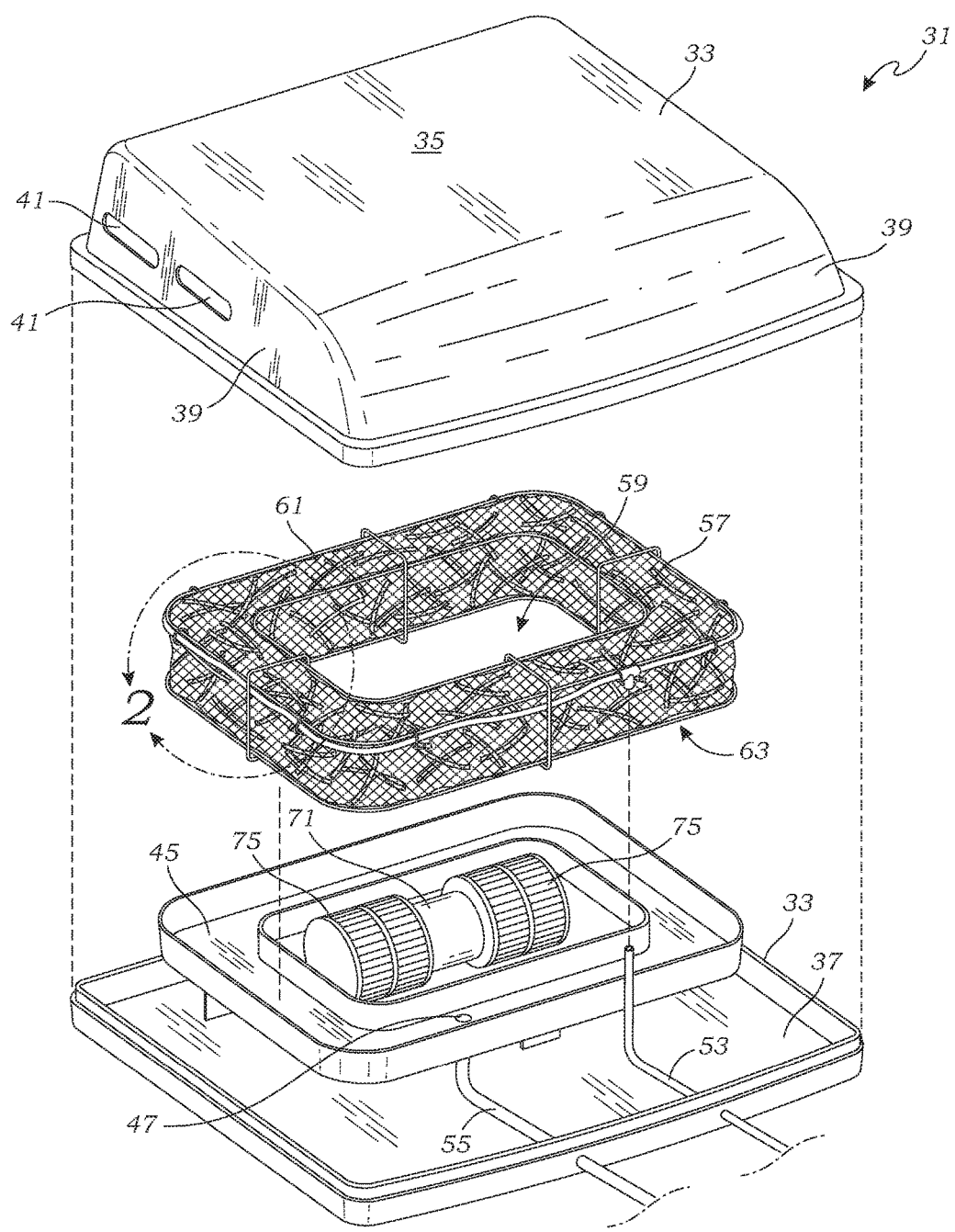
FIG. 1 is an exploded perspective view of the cooling unit for use with the vehicular cooling system of the present invention.

While the present invention is susceptible of embodiments in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all of the figures, the vehicular cooling system 1 is intended for cooling the interior of a traditional vehicle 3. The vehicle 3 includes a front 5, a rear 7, sides 9 and a roof 11. The front, rear, sides and roof form the vehicle's interior 13 which is intended to be cooled by the cooling system 1. The vehicular cooling system 1 includes three primary components, namely a water tank 21, a cooling unit 31 and a vent unit 89.

The water tank 21 is of a traditional design including a casing 23 which is preferably made of plastic which forms an interior cavity 25 for storing water 27. The water tank 21 may be of any size, but is preferably large enough to store at least five gallons of water, and it is preferred that the water tank be mounted to the vehicle structure in a place where it will remain cool such as away from the vehicle's engine compartment and away from direct sunlight.

The cooling system's cooling unit 31 and vent unit 89 are mounted to opposite sides of a vehicle panel, such as the vehicle's roof. The cooling unit 31 is mounted to the vehicle's exterior while the vent unit 89 is mounted within the vehicle's interior 13. The cooling unit includes a housing 33 having a top 35, a bottom 37, and preferably four sidewalls 39. To provide better aerodynamics, it is preferred that the front sidewall be tapered. In addition, the cooling unit 31 includes at least one air inlet 41 so as to allow air to enter into the cooling unit's central cavity. In addition, the housing includes an outlet 43 formed into the housing's bottom 37 so as to allow air to be expelled from the cooling unit 31 into the vehicle's interior 13. As illustrated in FIG. 1, the cooling unit's housing 33 may include a tray 45 which includes a drain hole 47.

Figure 2:
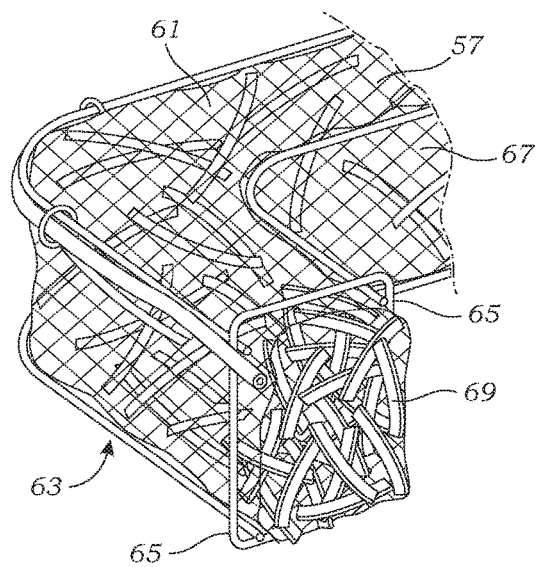
FIG. 2 is a cutaway perspective view of the evaporative media of the vehicular cooling system.
Figure 3:
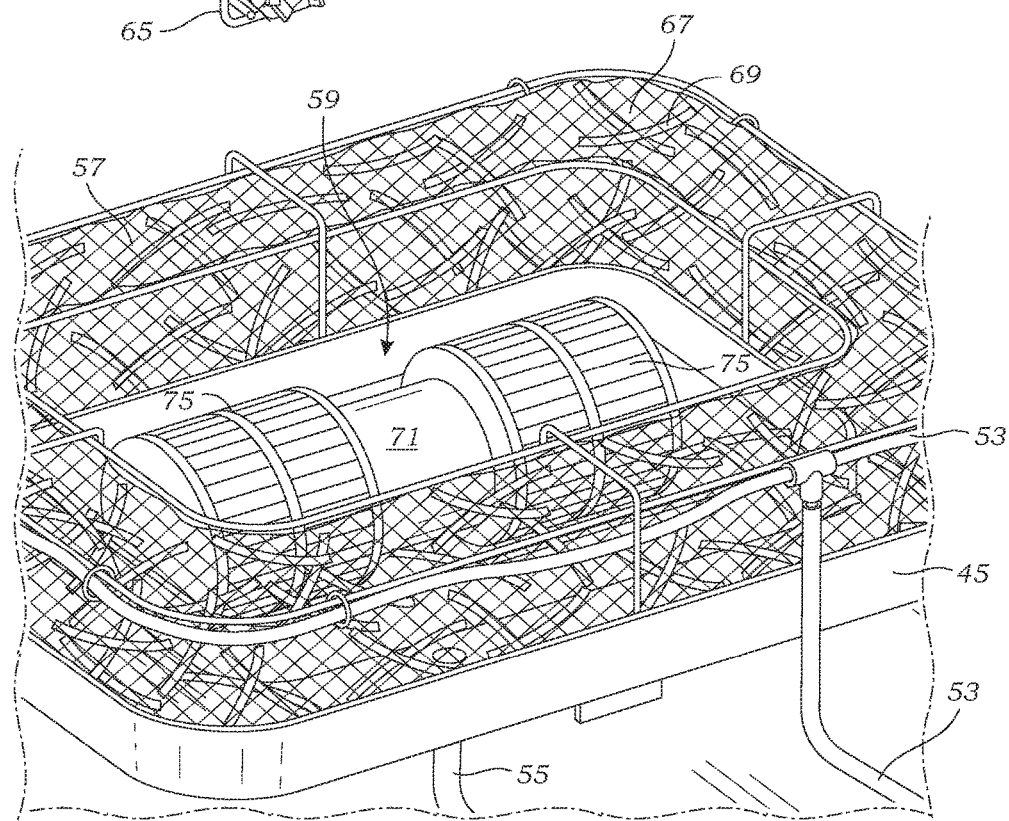
FIG. 3 is a top perspective view illustrating the evaporative media and air pump of the vehicular cooling system.
Figure 4:
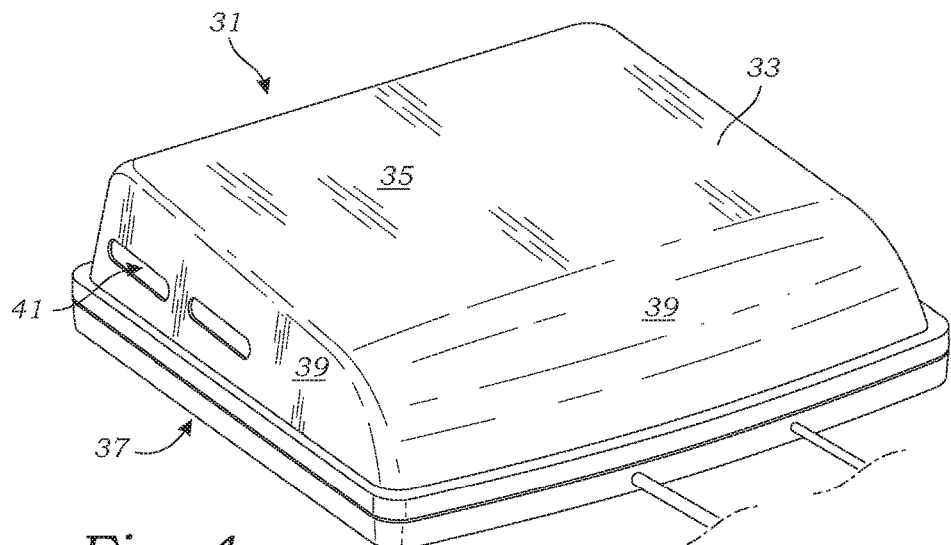
FIG. 4 is a top perspective view of the cooling unit for use with the vehicular cooling system.
Figure 5:
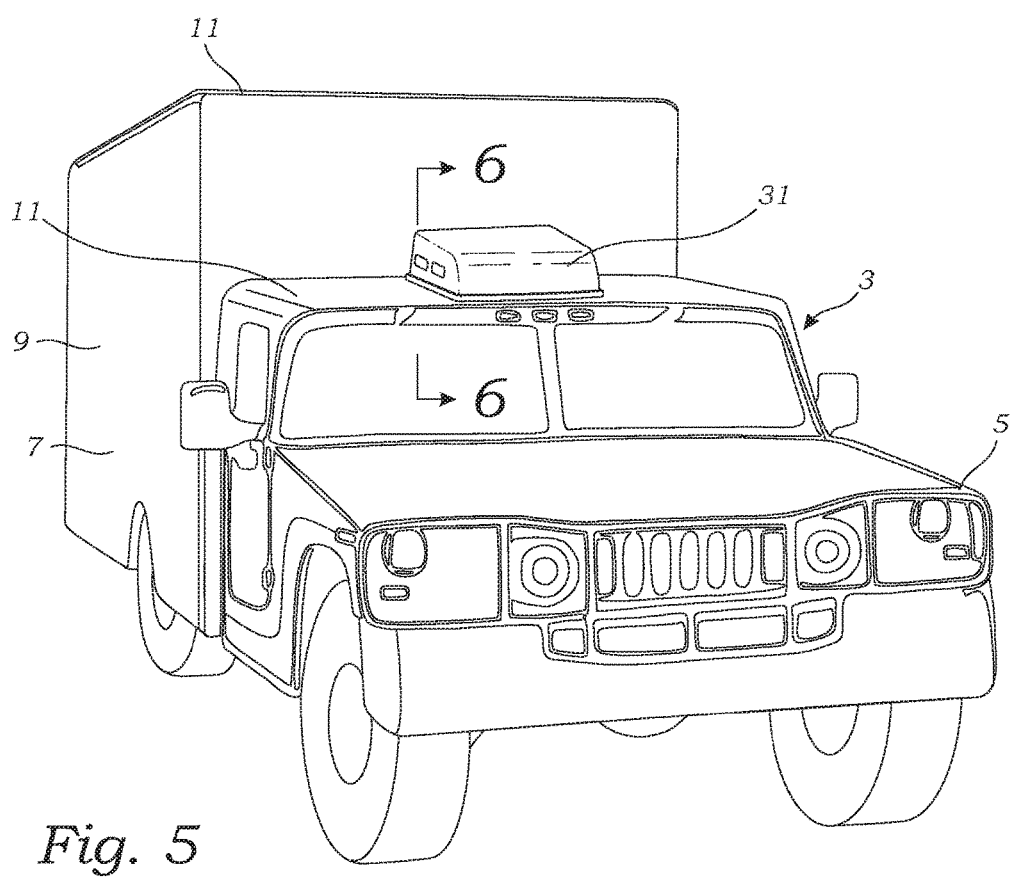
FIG. 5 is a front perspective view illustrating a vehicle with a vehicular cooling system.
Figure 6:
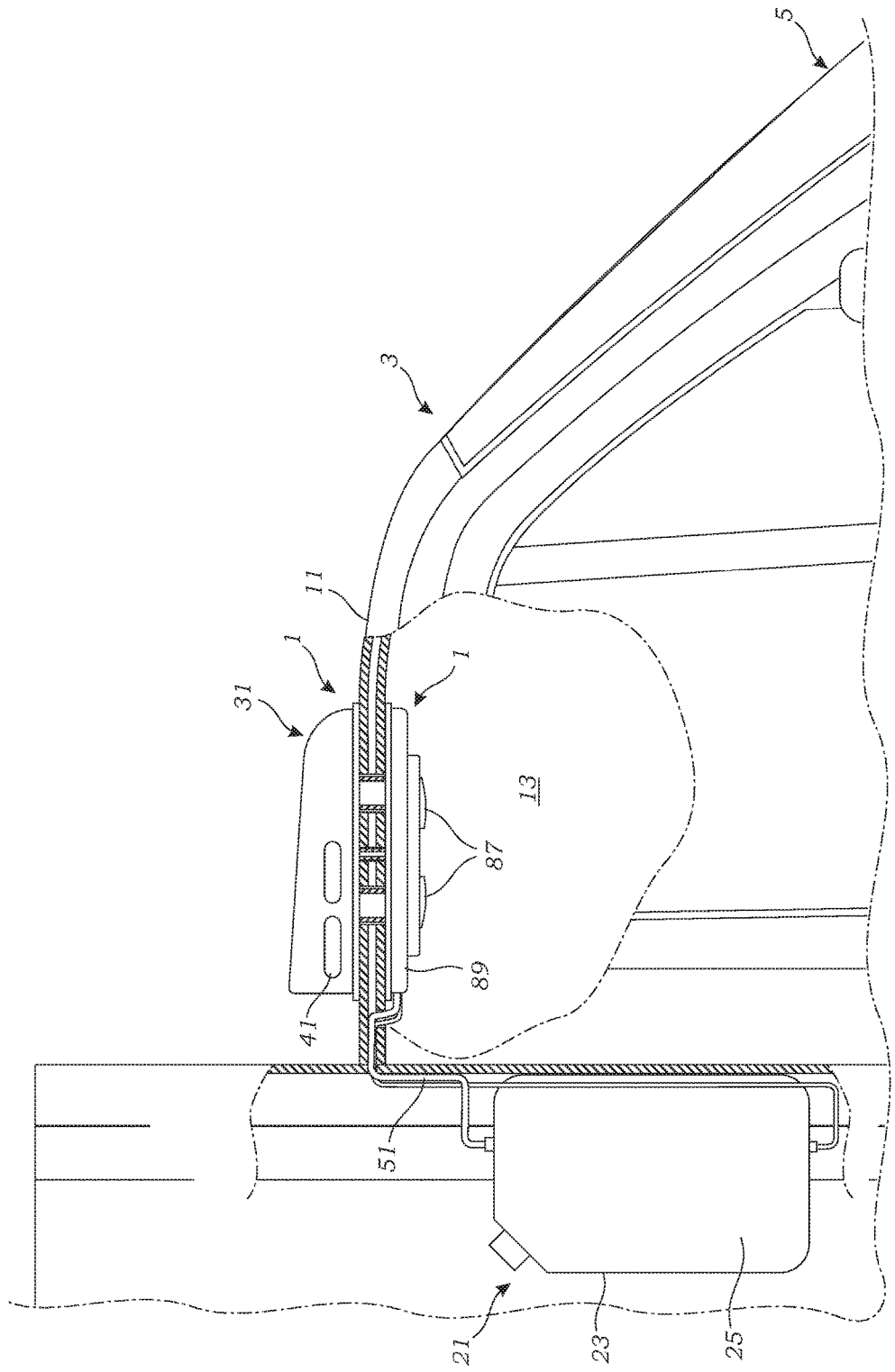
FIG. 6 is a side cutaway view of a vehicle including a vehicular cooling system.

The cooling unit 31 further includes an evaporative media 57 and an air pump 71. As illustrated in FIGS. 1-3, it is preferred that the evaporative media 57 be positioned upon the cooling unit's tray 45. The evaporative media 57 has a closed loop construction so as to include a center hole 59. The evaporative media 57 may have virtually any shape, but in a preferred embodiment, it is preferred that the evaporative media be rectangular and positioned horizontally within the cooling unit's housing 33. The evaporative media has a top 61 which engages the housing's top 35. Conversely, the evaporative media has a bottom 63 which engages the housing's bottom 37, which as illustrated in FIG. 1 is preferably the tray 45.

The evaporative media 57 is made of a gas porous material so that air can flow freely from exterior of the evaporative media into its center hole 59. Preferably, the evaporative media is made of elongate wood shavings which are packed together to form the evaporative media's rectangular shape. Preferably, the wood shavings are an anti-bacterial wood such as pinewood or cedar wood. To hold the wood shavings in a rectangular shape, preferably the evaporative media includes a plastic mesh 69 and a metal frame 65 (as illustrated in FIG. 2).

As illustrated in FIGS. 1-3, the cooling unit's air pump 71 is positioned within the evaporative media's center hole 59. Preferably, the air pump 71 includes a single motor which rotates two turbines 75. As illustrated in FIGS. 6-8 and 16, preferably the cooling unit's housing has two outlets 43 through which air is pumped by the air pump turbines 75.

Figure 7:
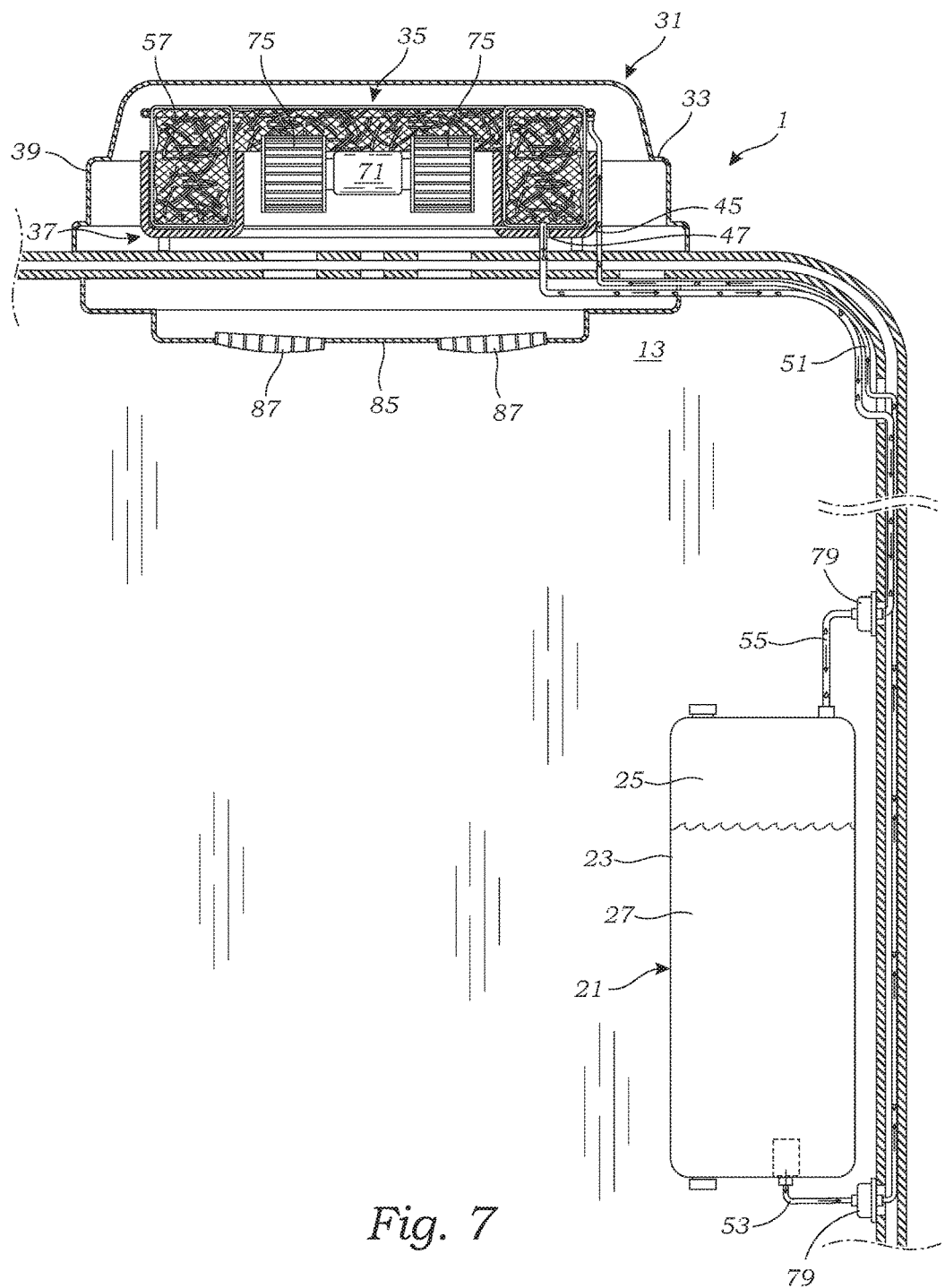
FIG. 7 is a side cutaway view illustrating a vehicular cooling system.
Figure 8:
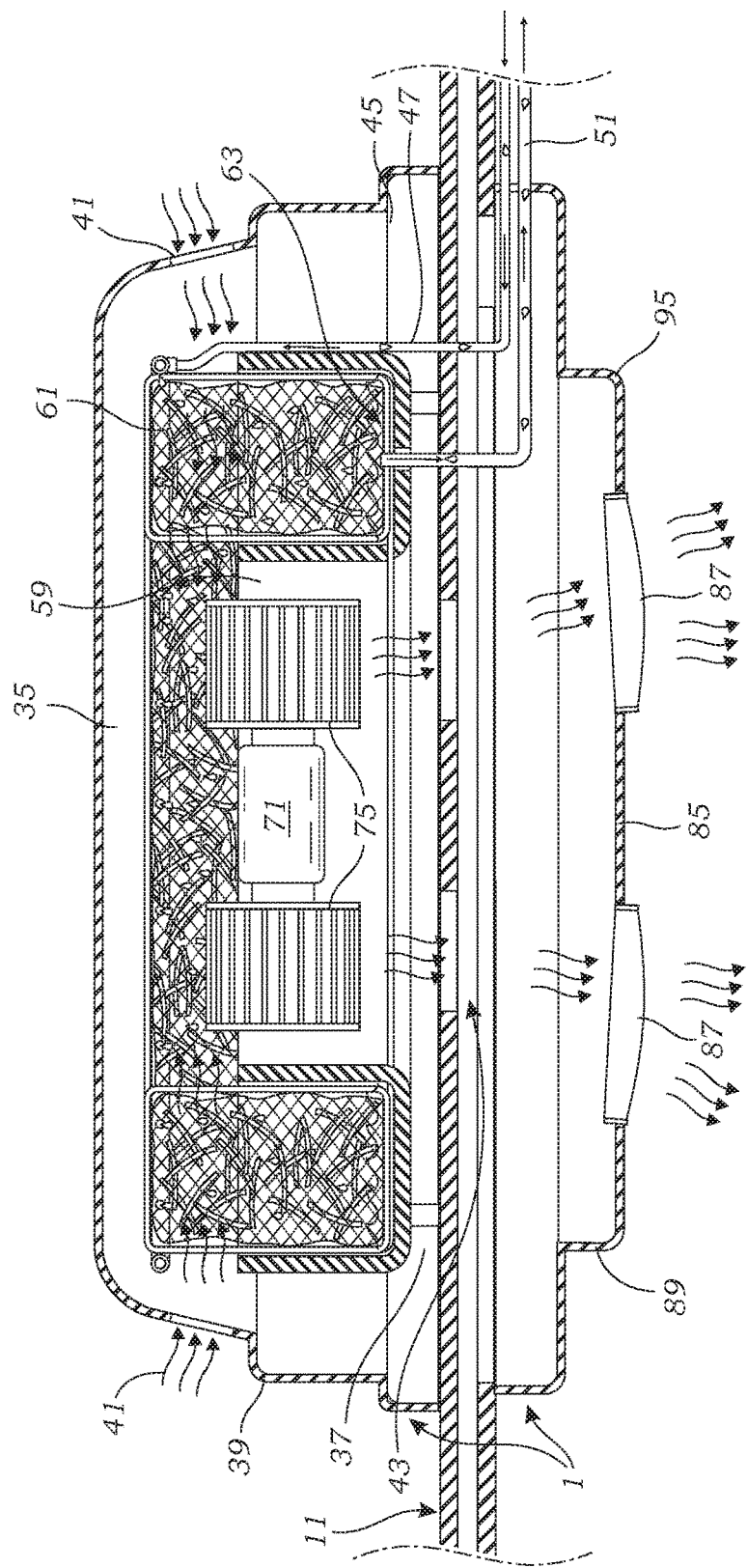
FIG. 8 is a side cutaway view of the cooling unit and venting unit affixed to a vehicle roof in accordance with the vehicular cooling system.
Figure 15:
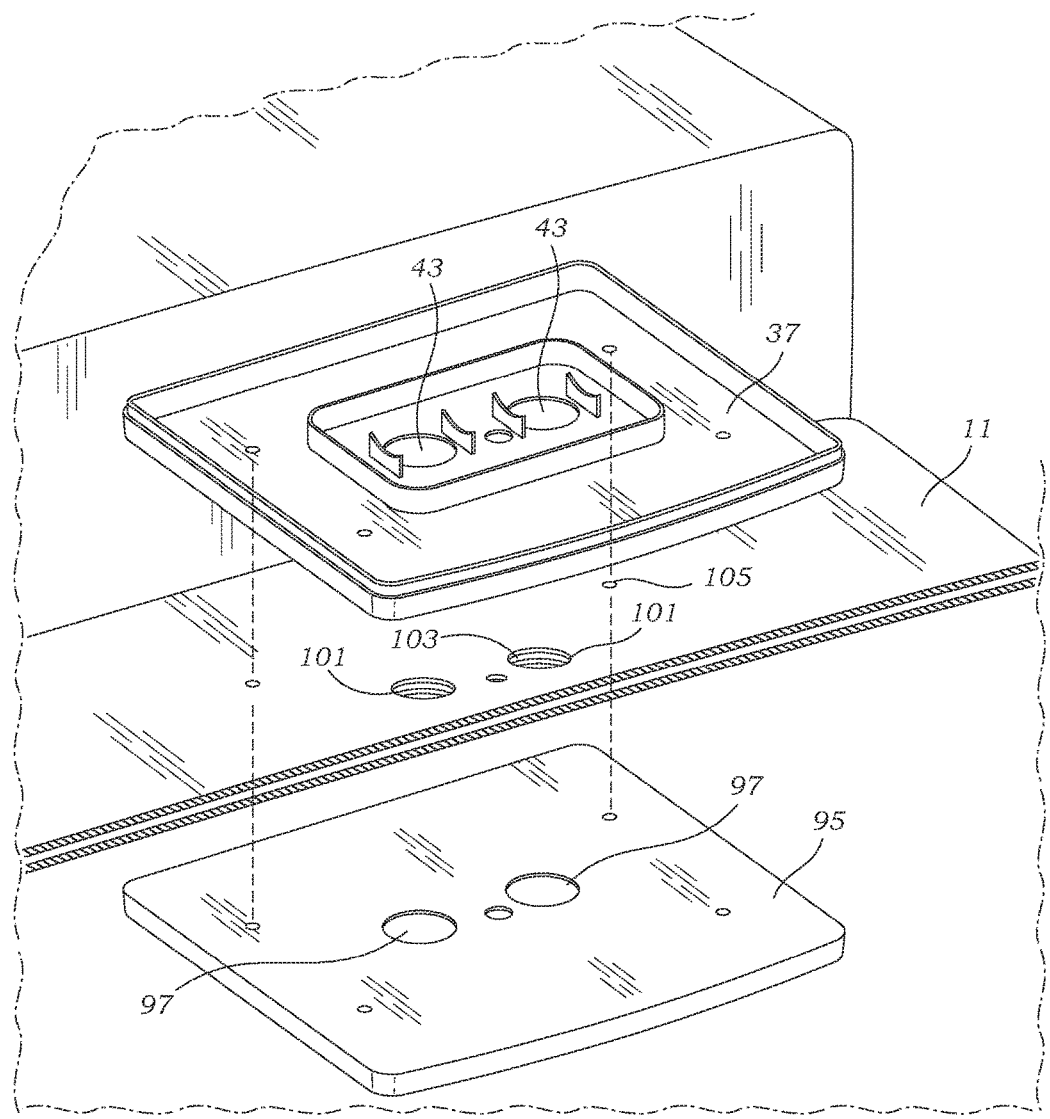
FIG. 15 is a front perspective view illustrating the cooling unit's bottom and venting unit's top being installed to a vehicle roof.
Figure 16:
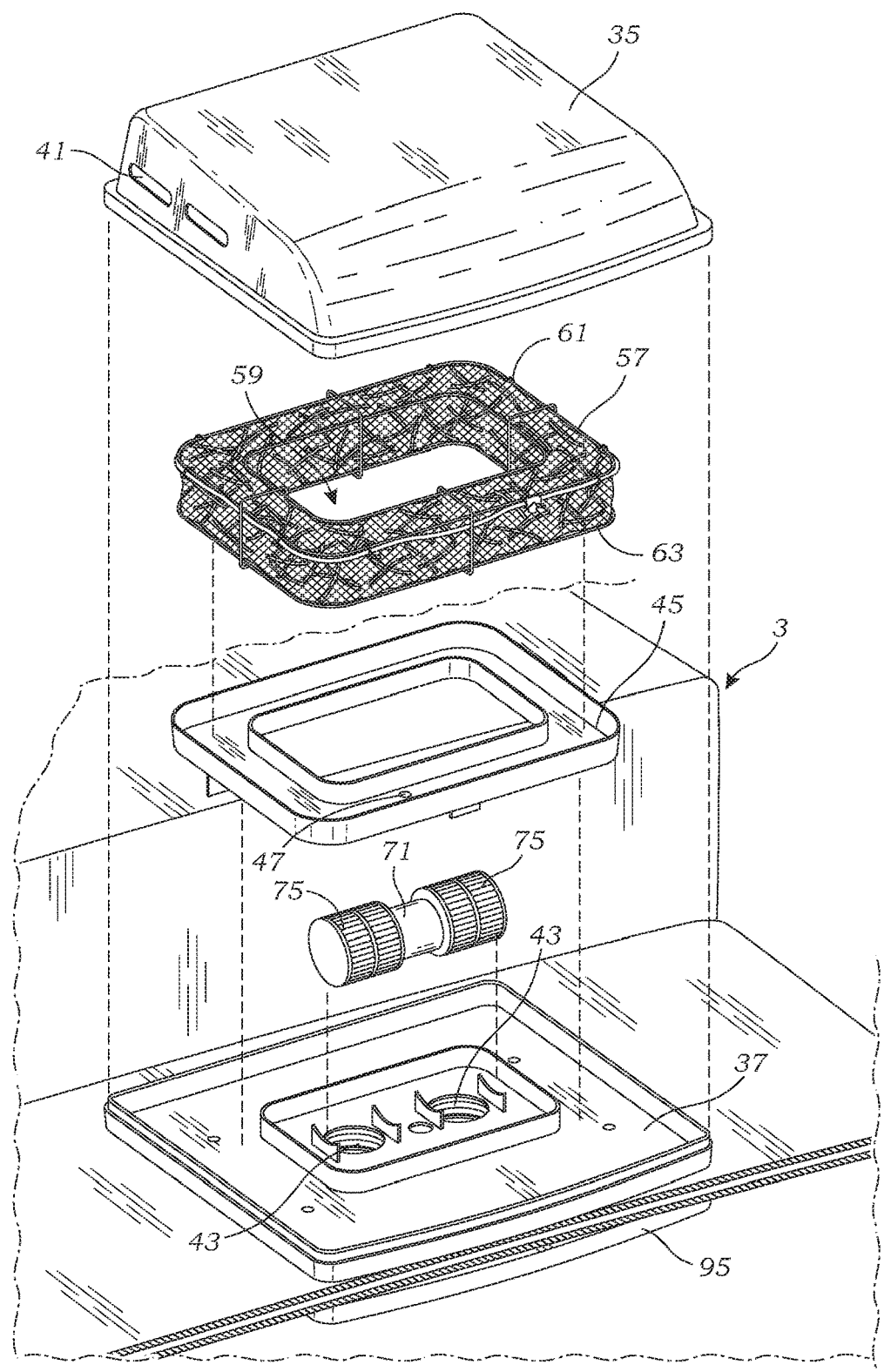
FIG. 16 is a perspective exploded view of the cooling unit being affixed to the top of a vehicle roof.
Figure 17:
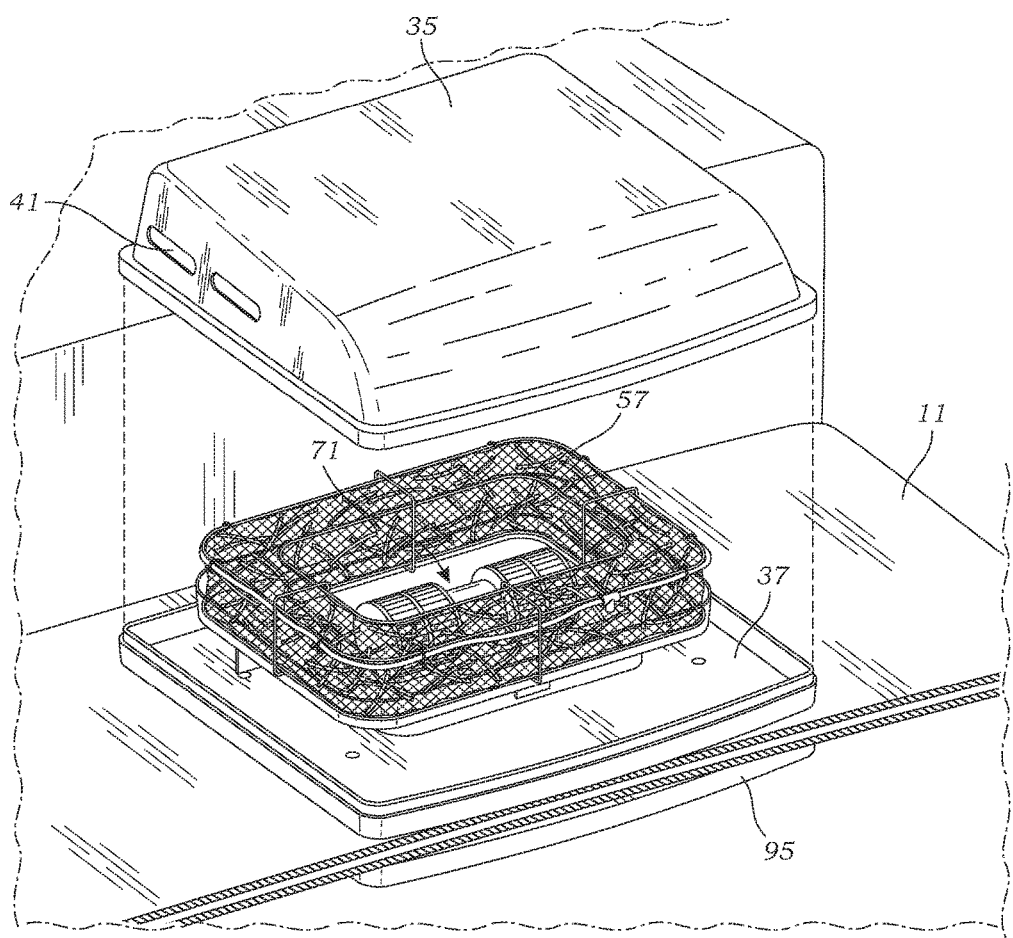
FIG. 17 is a perspective view of a cooling unit upon a vehicle's roof wherein the cooling unit's top panel is being installed.
Figure 18:
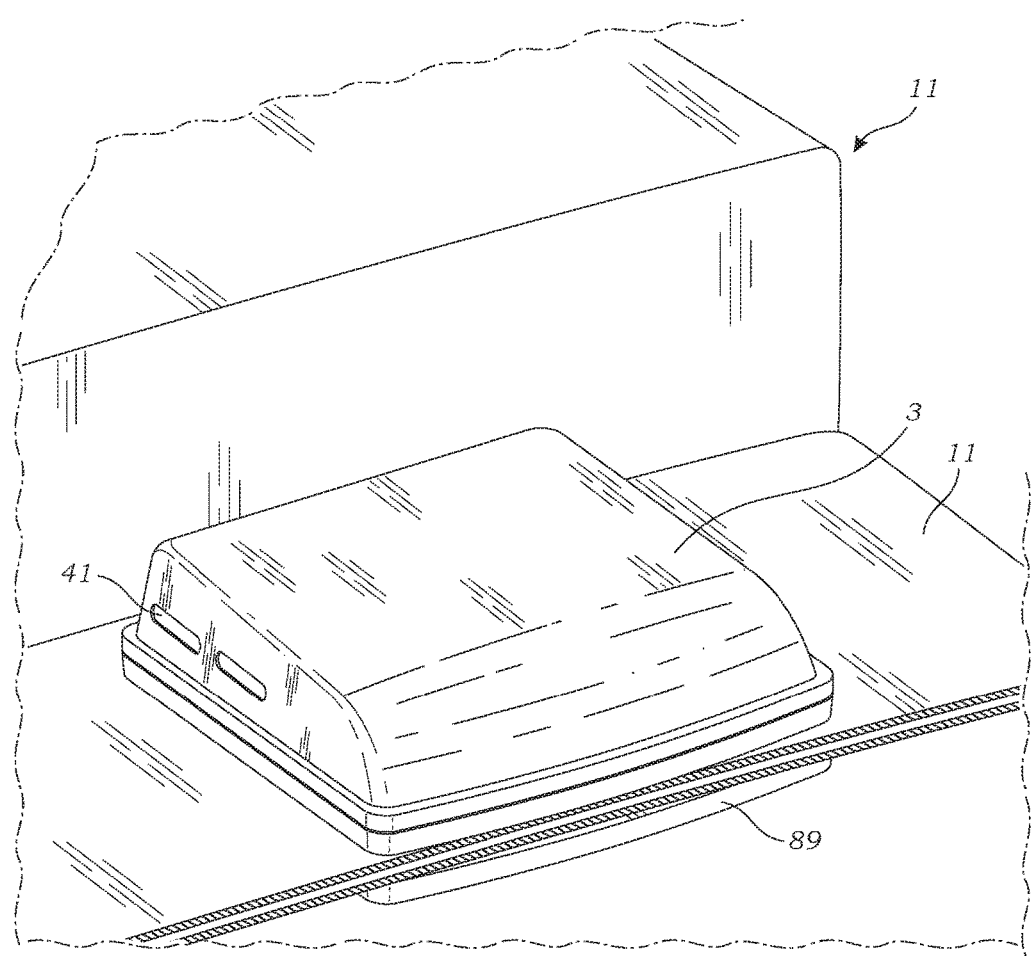
FIG. 18 is a front perspective view of a cooling unit upon a vehicle roof.

As illustrated in FIGS. 7, 8 and 15, the cooling system's vent unit 89 is mounted to the vehicle's roof 11 within the vehicle's interior on the opposite side of the cooling unit 31. The vent unit 89 is positioned so as to receive air from the cooling unit 31. To this end, preferably the vent unit's housing 91 includes an upper pan 95 which includes inlets 97 for receiving air from the cooling unit 31 and a lower pan 93 which includes vents 87 for blowing air into the vehicle's interior 13.

The vehicular cooling system 1 also includes a closed loop conduit assembly 51 for transporting water from the water tank 21 to the cooling unit's evaporative media 57, and then from the evaporative media 57 back to the water tank 21. The conduit assembly 51 includes a first conduit 53 through which water is pumped from the water tank 21 to the evaporative media 57. In addition, the conduit assembly 51 includes a second conduit 55 for carrying water from the evaporative media 57 back to the water tank 21. As illustrated in FIGS. 1-3, preferably the first conduit 53 encircles the top of the evaporative media 57 and includes holes (not shown) releasing water upon the evaporative media.

As illustrated in FIG. 7, the conduit assembly includes at least one water pump 79 for pumping the water 27 between the water tank 21 and cooling unit 31. For example, FIG. 7 illustrates each conduit 53 and 55 connected to a water pump 79. However, in a preferred embodiment, the vehicular cooling system includes a single water pump which is capable of transporting water in both directions.

Figure 9:
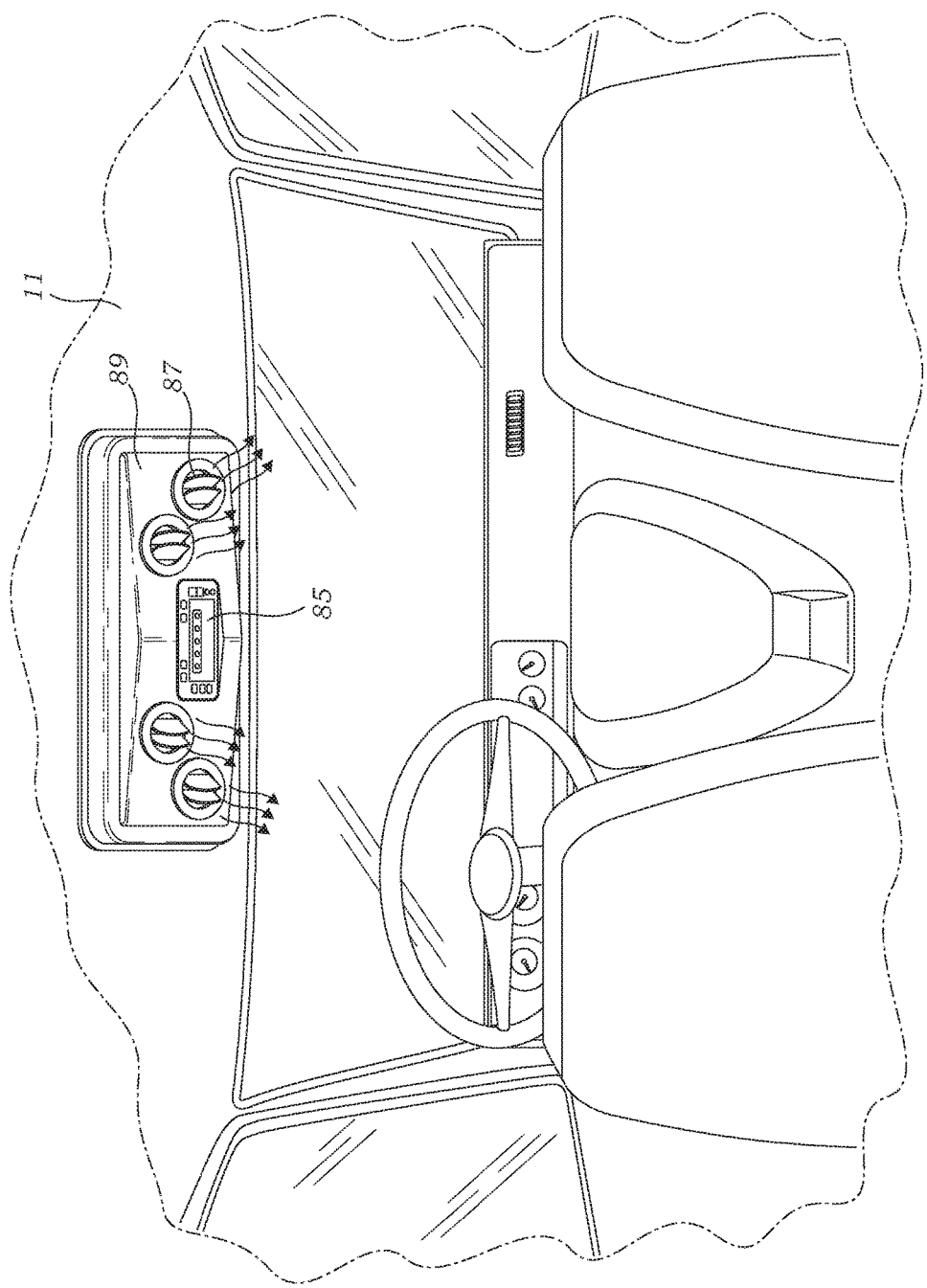
FIG. 9 is an interior view of a vehicle illustrating the venting unit with controller of the vehicular cooling system.
Figure 10:
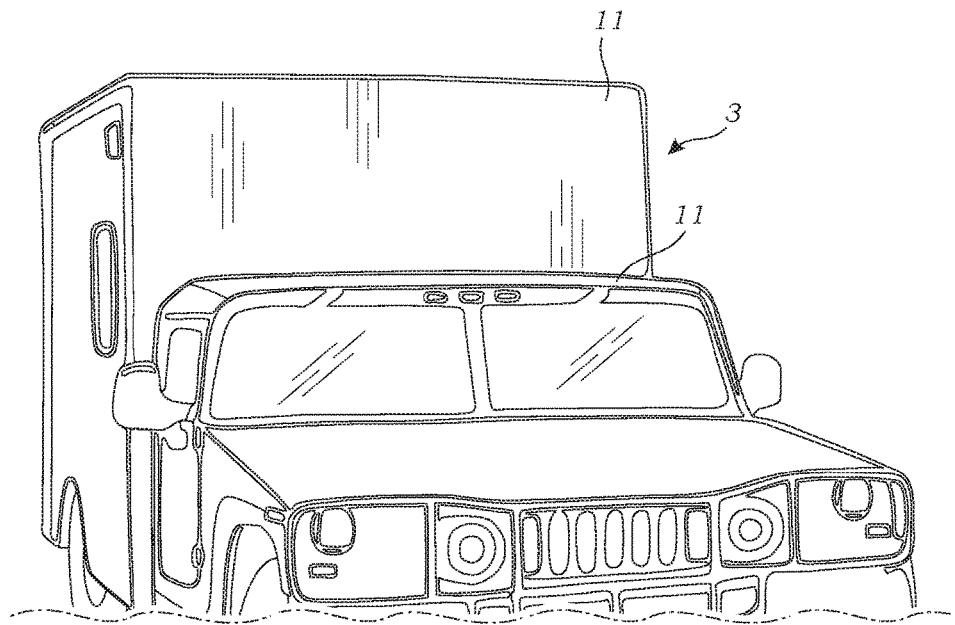
FIG. 10 is a front perspective view of a vehicle for use with the vehicular cooling system.
Figure 11:
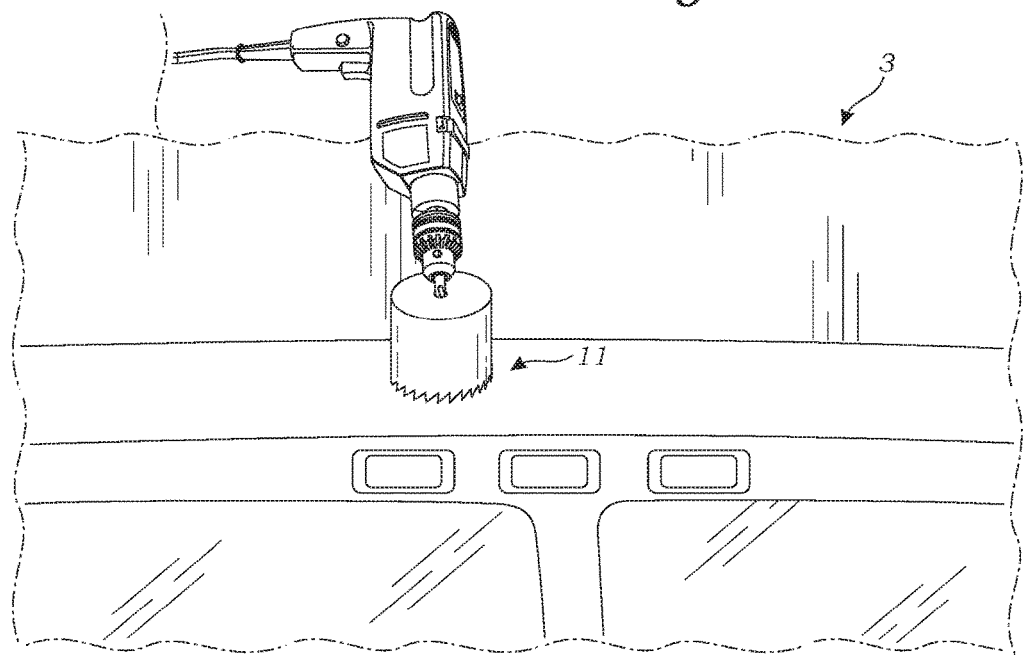
FIG. 11 is a perspective view illustrating the roof of a vehicle prior to an initial air hole being drilled.
Figure 12:
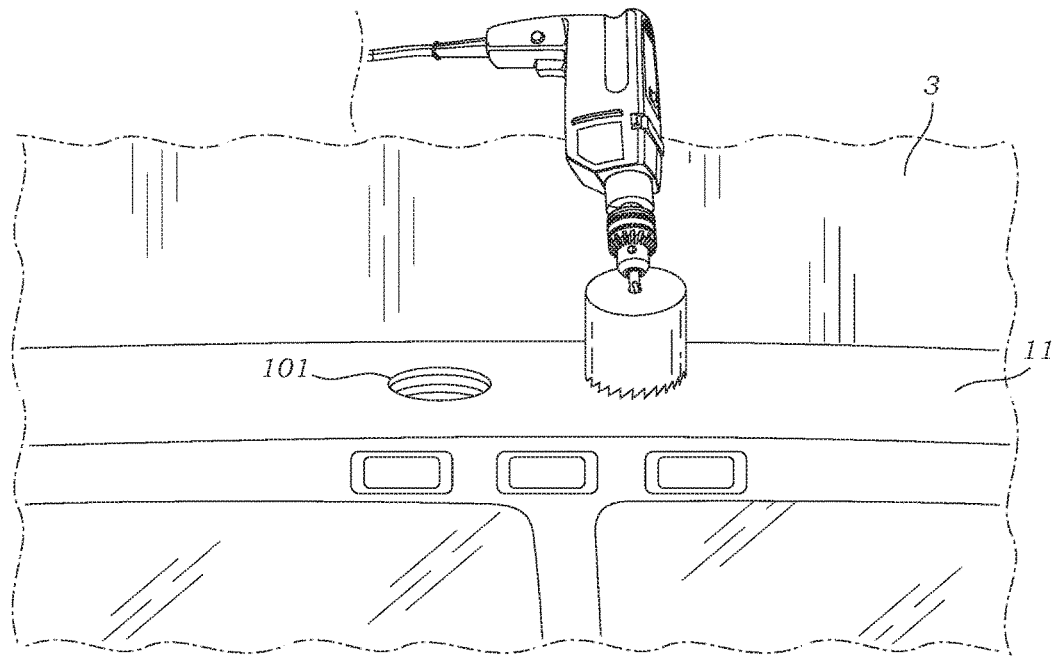
FIG. 12 is a front perspective view of the vehicle illustrated in FIG. 11 after a first air hole has been drilled.

The vehicular cooling system includes a controller 85 for collectively supplying electricity to the air pump 71 and water pump 79 from the vehicle's battery. Preferably, the controller 85 is mounted to the bottom of the vent unit 89. The controller may comprise simple on/off switches. However, as illustrated in FIG. 9, preferably the controller 85 includes a control panel which displays the vehicle's interior temperature, and the controller incorporates thermistor control and timer capabilities.

Figure 13:
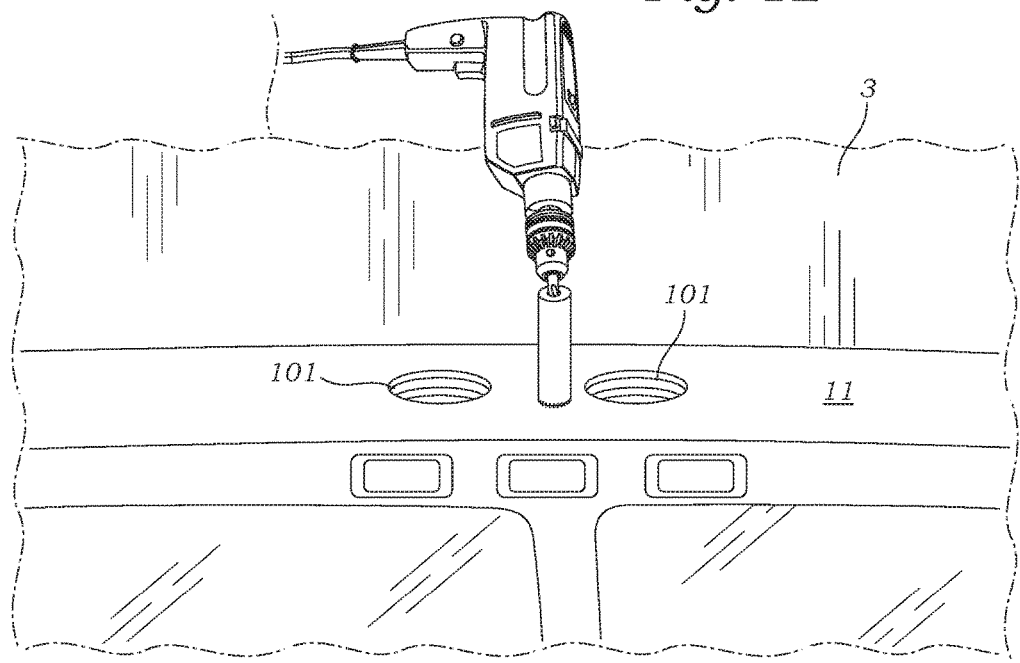
FIG. 13 is a front perspective view of the vehicle illustrated in FIG. 11 after two air holes have been drilled.
Figure 14:
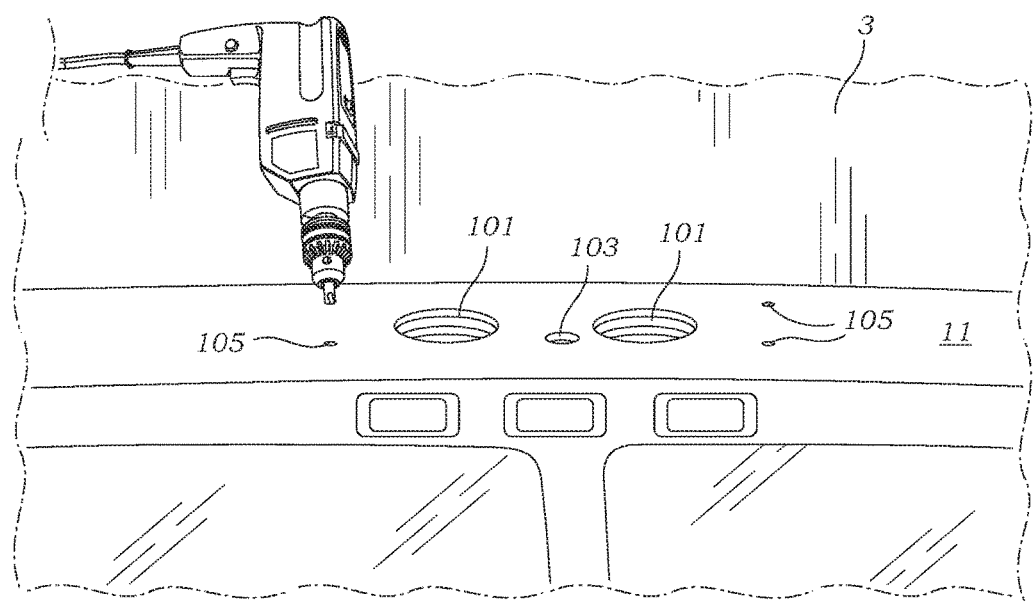
FIG. 14 is a front perspective view of the vehicle illustrated in FIG. 10 after two air holes and a harness hole has been drilled through the vehicle's roof.

Advantageously, the vehicular cooling system's cooling unit 31 and vent unit 89 can be installed upon a vehicle's roof with minimal alteration of the vehicle's structure. As illustrated in FIGS. 10-13, two air holes 101 are drilled into the vehicle's roof 11. Preferably, the air holes 101 have a diameter of approximately four inches which are the same shape and size as the cooling unit's outlets 43 and vent unit's inlets 97. In addition, as illustrated in FIG. 13, a small harness hole 103 is drilled into the vehicle's roof 11 so as to allow the passage of the conduit assembly 51. In addition, electrical wiring (not shown) from the controller 85 to the air pump 71 is routed through the harness hole 103. Preferably, the harness hole has an area of 10 in$^2$ or less, and more preferably has a diameter of one (1) inch. Preferably, installation of the cooling unit 31 and vent unit 89 upon the vehicle's roof requires only four installation holes 105, as illustrated in FIG. 14. Preferably, the installation holes 105 have a minimal diameter sufficient to accept small bolts which connect the cooling unit 31, which is exterior to the vehicle, to the vent unit 89 which is interior to the vehicle. Preferably, the installation holes have a diameter of ¾ inch or less, and more preferably have a diameter of approximately one-third (⅓) inch.

As illustrated in FIGS. 15-20, the cooling unit's bottom 37 and vent unit's upper pan 95 include various holes which are positioned to be adjacent to the roof's air holes 101, harness hole 103, and installation holes 105. During the installation process, the vehicular cooling system's cooling unit 31 is positioned on top of the vehicle's roof 11. As illustrated in FIGS. 19-20, the vent unit 89 is positioned to engage the vehicle's roof 11 within the vehicle's interior 13. Bolts (not shown) are inserted through the installation holes 105 so as to affix the cooling unit 31 and vent unit 89 in place. Meanwhile, as illustrated in FIG. 7, the conduit assembly 51 and water tank are mounted to the vehicle's interior.

In operation, the control panel 85 is triggered to operate the vehicular cooling system 1 so as to activate the water pump 79 and air pump 71. Water is pumped from the water tank 21 to the evaporative media 57. The evaporative media's wood shavings 69 become saturated with water. Any water dripping from the evaporative media 57 is collected by the tray 45 whereupon the water is collected by the drain hole 47 and pumped through the second conduit 55 back to the water tank 21. At the same time, the air pump 71 sucks air through the evaporative media 57 causing the air to be saturated with water. The water saturated air is then blown through the cooling unit's outlets 43, and the roof air holes 101 to be expelled through vents 87 into the vehicle's interior 11. The water-saturated-air causes a cooling effect within the vehicle's interior.

While several particular forms of the invention have been illustrated and described, it will be apparent that various modifications can be made without departing from the spirit and scope of the invention. Therefore, it is not intended that the invention be limited except by the following claims, having described my invention in such terms so as to enable persons skilled in the art to understand the invention, recreate the invention and practice it, and having presently identified the presently preferred embodiments thereof,

I claim:

1. A vehicular cooling system comprising:
    a vehicle having a roof wherein said roof has seven holes, said holes include no more than two air holes, one harness hole, and four installation holes, and where said air holes have an area of 50 in$^2$ or less, said harness hole has an area of 20 in$^2$ or less, and each of said installation holes are circular and have a diameter of ¾ inch or less;
    a water tank affixed to said vehicle;
    a cooling unit mounted upon said roof with four bolts that pass through said four installation holes, said cooling unit including;
        a housing have a top, a bottom, a central cavity and one or more sidewalls circumferentially enveloping said cavity, said housing having inlet formed through said one or more sidewalls which permits the passage of air, said housing having outlet formed through said housing's bottom which permits the passage of air;
        an evaporative media positioned within said housing's cavity, said evaporative media in the shape of a closed loop having a center hole adjacent to said housing's outlet, said evaporative media having a top that engages said housing's top and said evaporative media having a bottom which engages said housing's bottom; and
        an air pump for pumping air positioned within said housing's cavity and within said evaporative media's center hole, said air pump connected to said housing's outlet for receiving air from said housing's inlet and said evaporative media, for being pumped and expelled air through said housing's outlet to said roof's air holes;
    a closed loop conduit assembly which passes through said harness hole, said conduit assembly including a first conduit connecting said water tank to said cooling unit for transporting water within said water tank to said cooling unit for distribution upon said evaporative media, and a second conduit connecting said cooling unit to said water tank for transporting water within said cooling unit to said water tank; and
    at least one water pump connected to said closed loop conduit assembly for pumping water through said first and second conduits between said water and cooling unit.

2. The vehicular cooling system of claim 1 wherein said evaporative media is gas porous the entirety of said evaporative media's closed loop shape so that air entering into said housing through said inlet passes through said evaporative media before being expelled through said outlet, and said evaporative media is made of elongated wood shavings formed into a closed loop structure.

3. The vehicular cooling system of claim 2 wherein said elongated wood shavings are pine wood.

4. The vehicular cooling system of claim 2 wherein said elongated wood shavings are cedar wood.

* * * * *